US009833861B2

(12) United States Patent
Taniguchi et al.

(10) Patent No.: US 9,833,861 B2
(45) Date of Patent: Dec. 5, 2017

(54) FRICTION STIR WELDING METHOD FOR STEEL SHEETS AND METHOD OF MANUFACTURING JOINT

(71) Applicant: JFE Steel Corporation, Tokyo (JP)

(72) Inventors: Koichi Taniguchi, Tokyo (JP); Muneo Matsushita, Tokyo (JP); Rinsei Ikeda, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 15/025,633

(22) PCT Filed: Sep. 29, 2014

(86) PCT No.: PCT/JP2014/004984
§ 371 (c)(1),
(2) Date: Mar. 29, 2016

(87) PCT Pub. No.: WO2015/045420
PCT Pub. Date: Apr. 2, 2015

(65) Prior Publication Data
US 2016/0221117 A1 Aug. 4, 2016

(30) Foreign Application Priority Data

Sep. 30, 2013 (JP) .................................. 2013-204505
Oct. 31, 2013 (JP) .................................. 2013-227499

(51) Int. Cl.
*B23K 20/12* (2006.01)
*B23K 20/227* (2006.01)
(Continued)

(52) U.S. Cl.
CPC ........ *B23K 20/1235* (2013.01); *B23K 20/122* (2013.01); *B23K 20/1205* (2013.01);
(Continued)

(58) Field of Classification Search
CPC ........................................ B23K 20/122–20/128
(Continued)

(56) References Cited

U.S. PATENT DOCUMENTS 5,829,664 A * 11/1998 Spinella ............. B23K 20/1235
219/78.13
5,942,314 A * 8/1999 Fisher .................... B23K 20/10
228/1.1
(Continued)

FOREIGN PATENT DOCUMENTS

CN 1313238 C 5/2007
EP 1514632 3/2005
(Continued)

OTHER PUBLICATIONS

Japanese Office Action dated Jul. 19, 2016, of corresponding Japanese Application No. 2015-502989 along with a Concise Statement of Relevance of Office Action in English.
(Continued)

*Primary Examiner* — Kiley Stoner
(74) *Attorney, Agent, or Firm* — DLA Piper LLP (US)

(57) ABSTRACT

A friction stir welding method for welding steel sheets together includes a heating device disposed ahead of a rotating tool in an advancing direction that preheats an unwelded portion before the welding thereof by the rotating tool and at the time of preheating, the surface temperature distribution in a direction perpendicular to the advancing direction in a position at which the welding by the rotating tool is initiated is set such that given that $T_{Ac1}$ is the $Ac_1$ point of a steel sheet, the maximum temperature ($T_U$) thereof is $0.6 \times T_{Ac1} < T_U < 1.8 \times T_{Ac1}$, and given that L is the width of the heating region exceeding a temperature ($T_L$)=$0.6 \times T_{Ac1}$, $0.3 \times d \leq L \leq 2.0 \times d$ is satisfied with a diameter (d) of the shoulder.

21 Claims, 3 Drawing Sheets

(51) Int. Cl.
  *C21D 9/50* (2006.01)
  *C21D 1/42* (2006.01)
  *B23K 101/18* (2006.01)
  *B23K 103/04* (2006.01)
(52) U.S. Cl.
  CPC ........ *B23K 20/1225* (2013.01); *B23K 20/227* (2013.01); *C21D 1/42* (2013.01); *C21D 9/50* (2013.01); *C21D 9/505* (2013.01); *B23K 2201/18* (2013.01); *B23K 2203/04* (2013.01); *Y02P 10/253* (2015.11)
(58) Field of Classification Search
  USPC ............................................... 228/112.1, 2.1
  See application file for complete search history.

(56) References Cited

U.S. PATENT DOCUMENTS

| | | | |
|---|---|---|---|
| 6,155,767 A | 12/2000 | Walker | |
| 6,802,444 B1* | 10/2004 | Petter | B23K 20/123 148/516 |
| 7,980,449 B2* | 7/2011 | Ding | B23K 20/001 228/112.1 |
| 2003/0116608 A1* | 6/2003 | Litwinski | B23K 20/1235 228/112.1 |
| 2004/0020970 A1* | 2/2004 | Palm | B23K 20/1235 228/112.1 |
| 2004/0046003 A1* | 3/2004 | Vyas | B23K 20/1235 228/112.1 |
| 2004/0056075 A1* | 3/2004 | Gheorghe | B23K 20/122 228/199 |
| 2005/0224562 A1* | 10/2005 | Prevey | B23K 9/00 228/233.1 |
| 2006/0065698 A1* | 3/2006 | Ishikawa | B23K 20/1265 228/112.1 |
| 2006/0086707 A1* | 4/2006 | Kou | B23K 9/167 219/137 R |
| 2006/0231595 A1 | 10/2006 | Quinn et al. | |
| 2007/0090159 A1* | 4/2007 | Nagano | B23K 37/0435 228/101 |
| 2007/0138239 A1* | 6/2007 | Kumagai | B23K 20/1235 228/227 |
| 2008/0099533 A1* | 5/2008 | Hanlon | B23K 20/122 228/112.1 |
| 2008/0302539 A1* | 12/2008 | Mallenahalli | B23K 20/1225 166/380 |
| 2009/0134203 A1* | 5/2009 | Domec | B23K 20/123 228/112.1 |
| 2009/0261146 A1* | 10/2009 | Hou | B23K 20/122 228/112.1 |
| 2010/0032413 A1* | 2/2010 | Brenner | B23K 9/23 219/75 |
| 2010/0136369 A1* | 6/2010 | Ayer | B23K 20/1225 428/683 |
| 2010/0178526 A1 | 7/2010 | Fujii et al. | |
| 2012/0279271 A1* | 11/2012 | Carter | H05B 6/101 72/342.8 |
| 2012/0298304 A1* | 11/2012 | Kato | B23K 20/1235 156/350 |
| 2012/0328837 A1* | 12/2012 | Goehlich | B23K 20/1255 428/156 |
| 2013/0075452 A1* | 3/2013 | Burford | B23K 20/1255 228/2.1 |
| 2014/0027496 A1* | 1/2014 | Castillo | B23K 20/12 228/102 |
| 2014/0061185 A1* | 3/2014 | Schindele | B23K 20/128 219/617 |
| 2014/0248470 A1* | 9/2014 | Blomqvist | B29C 65/4815 428/188 |
| 2016/0105935 A1* | 4/2016 | Jones | H05B 11/00 219/601 |

FOREIGN PATENT DOCUMENTS

| | | | |
|---|---|---|---|
| JP | 10225781 | 8/1998 | |
| JP | 3081808 B2 | 8/2000 | |
| JP | 2003094175 | 4/2003 | |
| JP | 2003-154470 A | 5/2003 | |
| JP | 2004-154790 | 6/2004 | |
| JP | 2004154790 A * | 6/2004 | |
| JP | 2005088080 A * | 4/2005 | ........ B23K 20/123 |
| JP | 2005288474 A * | 10/2005 | |
| JP | 2007-263299 A | 10/2007 | |
| JP | 4235874 B2 | 3/2009 | |
| JP | 4313714 B2 * | 8/2009 | |
| JP | 4537132 B2 | 9/2010 | |
| JP | 2012-40584 A | 3/2012 | |
| JP | 5099009 | 12/2012 | |
| JP | 2013-49092 A | 3/2013 | |
| WO | WO 9845080 A1 * | 10/1998 | ........ B23K 20/126 |
| WO | WO 2015045299 A1 * | 4/2015 | ....... B23K 20/1235 |
| WO | WO 2015045420 A1 * | 4/2015 | ......... B23K 20/122 |
| WO | WO 2015045421 A1 * | 4/2015 | ......... B23K 20/122 |
| WO | WO 2016147668 A1 * | 9/2016 | ........... B23K 20/12 |

OTHER PUBLICATIONS

Supplementary European Search Report dated Jul. 29, 2016, of corresponding, European Application No. 14849773.8.

Official Action dated Jan. 12, 2016 of corresponding Japanese Patent Application No. 2015-502989 along with a Concise Statement of Relevance of Office Action in English.

Official Action dated Apr. 25, 2017, of corresponding Korean Patent Application No. 2016-7009328, along with a Concise Statement of Relevance of Office Action in English.

Chinese Office Action dated Jul. 5, 2017, of corresponding Chinese Application No. 201480053292.3 along with a Search report in English.

\* cited by examiner

FRICTION STIR WELDING METHOD FOR STEEL SHEETS AND METHOD OF MANUFACTURING JOINT

TECHNICAL FIELD

This disclosure relates to a friction stir welding method for steel sheets and, particularly, seeks to improve joint strength.

BACKGROUND

A friction stir welding method is a method of performing welding without adding filler material, by inserting a rotating tool into an unwelded portion of working materials overlapped or butted together, moving the rotating tool while rotating it, and utilizing softening of the working materials caused by frictional heat generated between the rotating tool and the working materials, and the plastic flow created by stirring the softened portions with the rotating tool.

A portion where steel sheets are only butted together and have not been welded yet is referred to as an "unwelded portion", and a portion where steel sheets have been welded and integrated by a plastic flow is referred to as a "welded portion".

FIG. 1 shows an example of performing friction stir welding on steel sheets butted together.

As described in FIG. 1, with that friction stir welding method, the edge surfaces of steel sheets 21, 22 are butted together to form an unwelded portion 20, and a rotating tool 10 is moved along the unwelded portion 20 while being rotated. The rotating tool 10 is positioned above the steel sheets 21, 22, and configured to be rotated by a motor (not illustrated). A backing material 30 placed under the steel sheets supports the steel sheets when the steel sheets are pressurized by the rotating tool. The rotating tool 10 which is rotated by driving a motor moves in the direction indicated with arrow F while a probe 12 is kept in contact with the steel sheets 21, 22 at the unwelded portion 20. The probe 12 creates partial regions of plastic material around the probe, and the upper part 11 of a rotating body presses the steel sheets 21, 22 from above to prevent the material from being lost from the plastic zone. In this way, the butted portions of the unwelded portion 20 are heated and softened, and the steel sheets 21, 22 are solid state bonded by the plastic material created by the plastic flow to form a welded portion 25.

Regarding such friction stir welding, studies have been made for a method of performing heating separately from the welding using rotating tools for the purpose of accelerating the welding procedures or reducing welding defects.

For example, JP 3081808 B proposes a welding method using gas flame as the heating device. FIG. 2 shows a schematic diagram describing the procedures of performing friction stir welding using gas flame as the heating device. With that method, various types of gas flame 70 including oxyacetylene, oxypropane, and oxygen natural gas are used as the heat source to heat the welding members 1, 2. With the heating device 72, a substantially cylindrical gas nozzle part 71 from which gas flame 70 is injected is positioned near the front of the probe 62 in the moving direction, and the gas nozzle part 71 moves in conjunction with the movement of the probe 62. Further, the injecting position of the gas flame 70 in the unwelded portion 13 is described as being always positioned ahead of the welding device in the moving direction. Further, the injection width of the gas flame 70 is substantially the same size as the diameter of a shoulder 61 of a rotor 60 when the gas flame strikes the surfaces of the welding members 1, 2 and the tip of the gas flame widens. By doing so, only portions of the unwelded portion 13 near the probe 62 are heated, and the temperature of the portions near the probe and the surrounding regions is raised.

Operation of the heating device when performing the above friction stir welding method will be explained below. While injecting the gas flame 70 from the gas nozzle part 71 of the heating device 72, the rotor 60 of the welding device 3 is rotated and the probe 62 rotating integrally with the rotor 60 is inserted into the unwelded portion 13, and in a state where the probe 62 is inserted, the probe 62 is moved along the butted portion relative to the welding members 1, 2. By doing so, the welding members 1, 2 are welded to form a welded portion 14.

In friction stir welding using the heating device 72 shown in FIG. 2, a goal is to facilitate welding procedures using the probe 62 by heating the unwelded portion with the heat of the gas flame 70 to rapidly soften the contact portion of the probe 62 and the shoulder 61.

In JP 4235874 B, an induction heating device is used as the heat source. According to JP 4235874 B, the time required until initiating friction stir welding is shortened by providing a control mechanism where the temperature up to the temperature where welding is performed by the rotating tool is set to a predetermined temperature and, by doing so, controllability of the heating range and heating temperature is improved and cracks can be prevented from being formed in the welded portion regardless of the material used.

In JP 4537132 B, a laser beam is used as the heat source. According to JP 4537132 B, the unwelded portion is heated before performing welding with a welding tool (which is a rotating tool), and laser beam irradiation is stopped after the unwelded portion reaches a predetermined softening temperature. By doing so, it is described that wear of the welding tool can be suppressed.

As described above, with conventional friction stir welding, techniques of using gas flame, induction heating, or laser beam as the auxiliary heat source during operation have been proposed.

However, when performing friction stir welding of steel sheets using the methods described in JP 3081808 B, JP 4235874 B and JP 4537132 B, embrittlement resulting from temper softening or hardening occurs in the heat-affected zone and sufficient joint strength could not be obtained, even if it is possible to reduce welding defects or accelerate the welding speed.

It could therefore be helpful to provide a friction stir welding method for steel sheets with improved joint strength obtained at a high welding speed without the risk of generating welding defects and damage to the welding tool, or the risk of embrittlement due to temper softening or hardening in the heat-affected zone.

SUMMARY

We thus provide:
1. A friction stir welding method comprising:
inserting a rotating tool into an unwelded portion where two or more steel sheets are overlapped or butted together;
moving the rotating tool along portions to be welded while rotating the tool, so that a softened portion is formed in the steel sheets by friction heat generated between the rotating tool and the steel sheets, and the steel sheets are welded together by utilizing a plastic flow generated by the softened portion being stirred; and, preheating the unwelded portion before welding thereof by the rotating tool using a heating device disposed ahead of the rotating tool in the advancing direction, wherein a surface temperature distribution in a direction perpendicular to an advancing direction in the steel sheets is caused by the preheating, the surface temperature distribution at a position where welding is performed by the rotating tool being such that a maximum temperature $T_U$ satisfies $0.6 \times T_{Ac1} < T_U < 1.8 \times T_{Ac1}$, and a width L of a range exceeding a temperature $T_L = 0.6 \times T_{Ac1}$ satisfies $0.3 \times d \leq L \leq 2.0 \times d$ with respect to a diameter d of a shoulder of the rotating tool, where $T_{Ac1}$ is a temperature defined by formula (1) using amounts of added elements of the steel sheets:

$$T_{Ac1} = 723 - 10.7[\% \text{ Mn}] - 16.9[\% \text{ Ni}] + 29.1[\% \text{ Si}] + 16.9[\% \text{ Cr}] + 290[\% \text{ As}] + 6.38[\% \text{ W}] \quad (1)$$

where [% M] represents the content of M element (mass %) in the steel sheets.

2. The friction stir welding method according to aspect 1, wherein heat conductivity $TC_B$ of a backing material disposed in a position opposite to a rotating tool across the unwelded portion satisfies $0.5 \times TC_S \, TC_B \, 1.0 \times TC_S$ with respect to heat conductivity $TC_S$ of the steel sheets.

3. The friction stir welding method according to aspect 1 or 2, wherein the heating device is a high-frequency induction heating device, and the frequency to be used of the heating device is 20 kHz or more and 360 kHz or less.

4. The friction stir welding method according to any one of aspects 1 to 3, wherein the C content of the steel sheet containing most C among the two or more steel sheets is 0.1 mass % or more and 0.6 mass % or less.

5. The friction stir welding method according to aspect 1, wherein a rear heating device for re-heating the welded portion is disposed behind the rotating tool in the advancing direction, and the maximum temperature $T_p$ after re-heating of the region to be re-heated by the rear heating device satisfies $0.6 \times T_{Ac1} \, T_p \, 1.2 \times T_{Ac1}$, where $T_{Ac1}$ is a temperature defined by formula (1) using amounts of added elements of the steel sheets:

$$T_{Ac1} = 723 - 10.7[\% \text{ Mn}] - 16.9[\% \text{ Ni}] + 29.1[\% \text{ Si}] + 16.9[\% \text{ Cr}] + 290[\% \text{ As}] + 6.38[\% \text{ W}] \quad (1)$$

where [% M] represents the content of M element (mass %) in the steel sheets.

6. The friction stir welding method according to aspect 5, wherein a cooling device is disposed between the rotating tool and the rear heating device to cool the welded portion.

7. A method of manufacturing a joint of the steel sheets using the friction stir welding method according to any one of aspects 1 to 6.

With this disclosure, it is possible to weld steel sheets at a high welding speed without causing welding defects or damaging tools.

Figure 1:
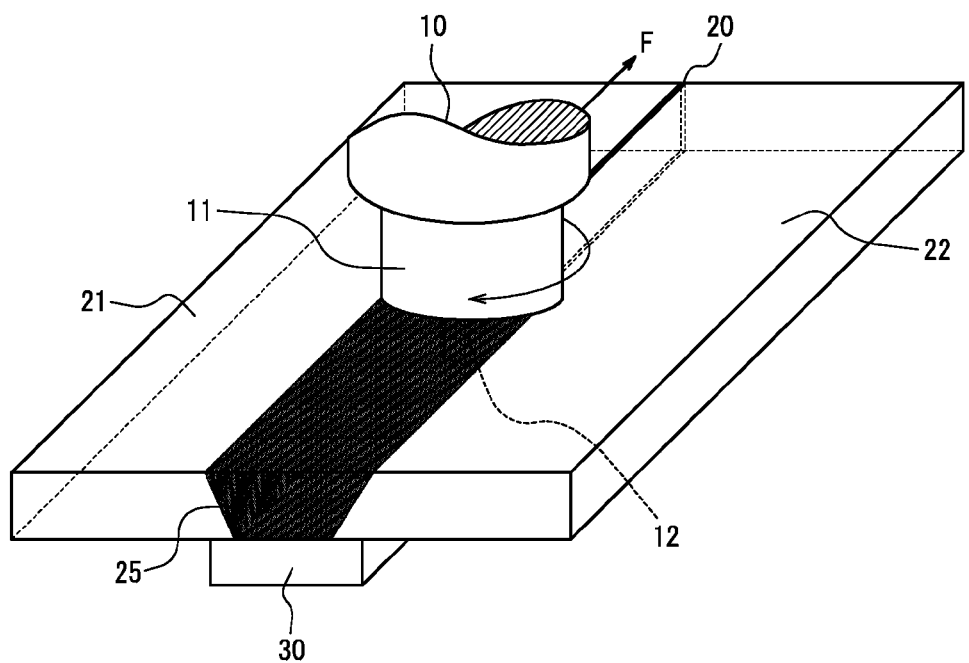
FIG. 1 shows the general welding procedures of when performing friction stir welding on steel sheets which are butted together.
Figure 2:
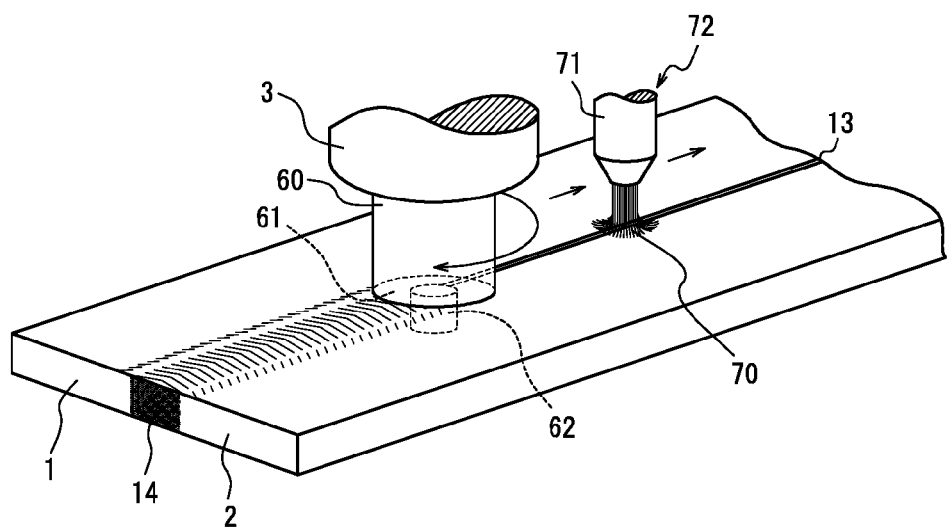
FIG. 2 shows the procedures of when performing friction stir welding using gas flame as the heating device.

REFERENCE SIGNS LIST 1, 2 Welding member
3 Welding device
4 Induction heating device
8 Rear heating device
9 Cooling device
10 Rotating tool
11 Upper part of the rotating body
12 Probe
13 Unwelded portion
14 Welded portion
20 Unwelded portion
21, 22 Steel sheets
25 Welded portion
30 Backing material
35 Power source
40 Heating temperature setting panel
60 Welding tool (rotor)
61 Shoulder
62 Probe
70 Gas flame
71 Gas nozzle part
72 Heating device

DETAIL DESCRIPTION

We investigated the relationship between the temperature distribution right before initiating welding using a rotating tool and the conditions of the joint, in friction stir welding of steel sheets.

As a result, we discovered the following:

(1) When the heated region is broad, good welded portions are obtained due to the influence of softening. However, the range of the heat-affected zone is expanded because of the large influence of the heat generated by the steel sheets and the rotating tool.

(2) Conversely, when the heated region is too small, the welding performed by the rotating tool becomes insufficient, and defects occur more easily.

(3) Therefore, when performing friction stir welding of steel sheets, the management of the temperature range right before the welding is particularly important.

Therefore, we heated welding portions using a heating device disposed ahead of the rotating tool in the advancing direction under various conditions to manage the temperature range right before welding. Further, we conducted intense investigations particularly regarding the influence of the surface temperature distribution in a direction perpendicular to the advancing direction on the conditions of the joint, caused by the heating, at a position where welding is performed by the rotating tool (i.e. a position where the rotating tool reaches in welding, hereinafter simply referred to as "welding position").

The microstructure, hardness, form of fracture and the like of the weld joint obtained as described above were intensely investigated, and we discovered that by raising the temperature in the welding position to a certain temperature, high speed welding is made possible by the softening of the steel sheets. However, we discovered that if the temperature is excessively raised, the plastic flow which is the principle of friction stir welding is reduced, and defects are caused.

Further, we discovered that if the temperature in the welding position does not reach a certain temperature, heating caused by the tool becomes the main source of heating, and since such structure is nothing different from those of conventional methods, joint strength is not improved. However, we also found that with an excessively high temperature, the friction heat caused by the tool is reduced and the change in temperature distribution caused by the tool does not take place and, since quenching is performed in such state, embrittlement is caused.

Further, with high-C steel, cracks may occur due to embrittlement caused by rapid cooling after welding or residual stress generated from restraining, because of the high quench hardenability of said steel. Therefore, the cooling rate may need to be decreased or the hardening and embrittlement caused by tempering may need to be suppressed.

Based on the above, we investigated re-heating after the welding as well as cooling after welding and before the re-heating and, as a result, the effectiveness thereof was confirmed.

Our methods and products will be described in detail below.

The disclosure relates to friction stir welding where steel sheets are welded together by inserting a rotating tool into an unwelded portion where two or more steel sheets are overlapped or butted together, moving the rotating tool while rotating the same along the portions to be welded, and utilizing the softening of the steel sheets caused by the friction heat generated between the rotating tool and the above steel sheets and the plastic flow created by stirring the softened portions. Any friction stir welding device that enables welding steel sheets by pressurizing and rotating the rotating tool may be used, and the controlling method thereof is not particularly limited such as whether the device is controlled by positioning or pressurization.

As the rotating tool, a tool having a flat part called the shoulder and a protrusion called a probe which is concentric with the shoulder, is normally used. The shape of the probe is not limited and treatment such as a screw-like spiral may be performed thereto. Further, although the material is not particularly limited either, ceramics or metal material having excellent high temperature strength is preferable.

Figure 3:
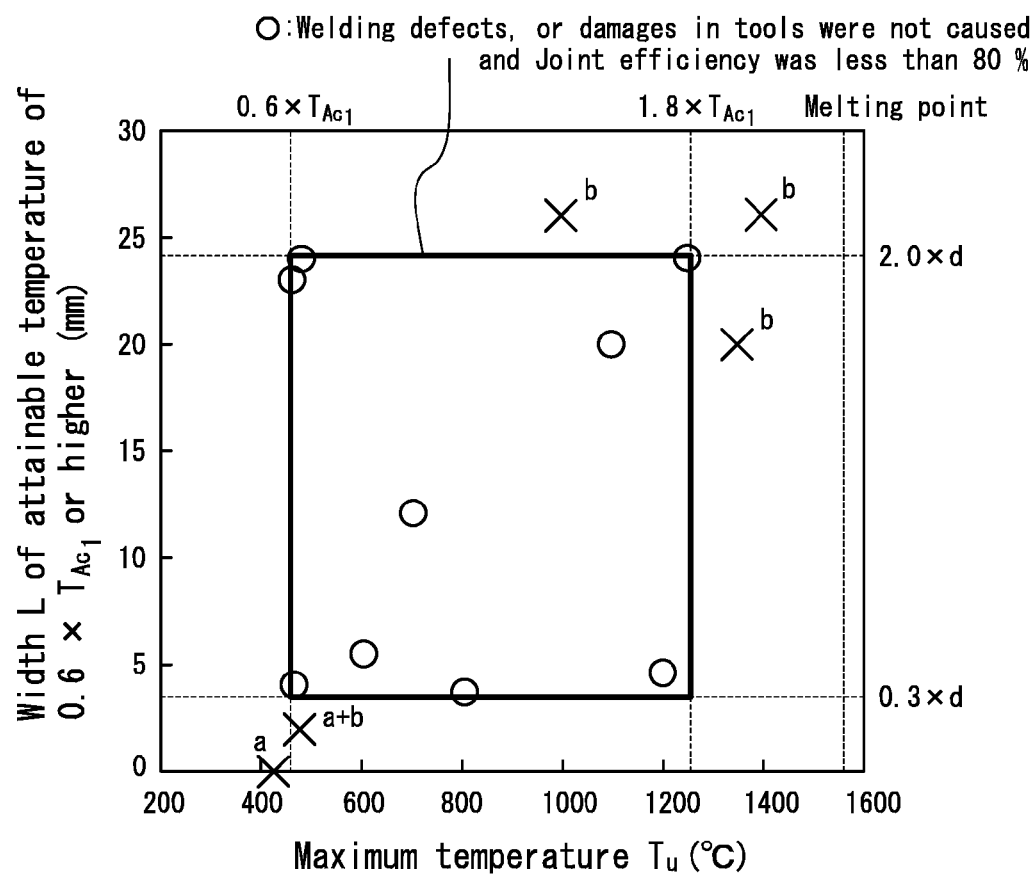
FIG. 3 shows the relationship between temperature conditions in the welding position and presence of welding defects or damages of tools and joint efficiency, of when performing welding at the front of the welding tool in the advancing direction while heating the steel sheets under various conditions.

FIG. 3 shows the results of investigating the relationship between temperature conditions in the welding position and presence of welding defects or damages of tools and joint efficiency, of when performing welding at the front of the welding tool in the advancing direction while heating the steel sheets under various conditions. The data was obtained by performing butt-welding or overlap welding at a welding speed of 1 m/min and an $Ac_1$ temperature of 720° C. on steel sheets with a sheet thickness of 1.0 mm to 3.0 mm, using a welding tool having a shoulder diameter d of 12 mm.

As shown in FIG. 3, in the welding position, temperature distribution occurs in the surface of the direction perpendicular to the advancing direction, and given that the maximum temperature in the temperature distribution is defined as $T_U$, a high strength joint with joint efficiency of joint strength exceeding 80% of the base material is obtained without causing welding defects or damaging tools when $T_U$ satisfies $0.6 \times T_{Ac1} < T_U < 1.8 \times T_{Ac1}$, and a width L of a range exceeding a temperature $T_L$ ($=0.6 \times T_{Ac1}$) satisfies $0.3 \times d \leq L \leq 2.0 \times d$ with respect to a diameter d of a shoulder of the rotating tool, where $T_{Ac1}$ is a temperature defined by formula (1) using amounts of added elements of the steel sheets and corresponds to the $Ac_1$ point of steel:

$$T_{Ac1} = 723 - 10.7[\% \text{ Mn}] - 16.9[\% \text{ Ni}] + 29.1[\% \text{ Si}] + 16.9[\% \text{ Cr}] + 290[\% \text{ As}] + 6.38[\% \text{ W}] \quad (1)$$

where [% M] represents the content of M element (mass %) in the steel sheets.

By raising the maximum temperature $T_U$ to over $0.6 \times T_{Ac1}$, it is possible to perform high speed welding due to the preferable softening of the steel sheets. However, if the maximum temperature $T_U$ is raised to $1.8 \times T_{Ac1}$ or higher, the plastic flow which is the principle of friction stir welding is reduced, and welding defects are caused.

The heating means is not limited to a particular type and any means capable of heating up to a predetermined temperature may be used. However, heating means using high-frequency induction heating or a laser beam are advantageously applied.

Particularly, when using a high-frequency heating device, the frequency is preferably 20 kHz or more and 360 kHz or less in view of heating efficiency and heating range. By using a device of such frequency, it is possible to control the temperature to the above temperature range.

For the positional relationship between the welding tool and the heating device as well as the heating range, the temperature before performing welding is important and, as long as the heating device is disposed ahead of the welding tool in the advancing direction, the distance from the welding tool to the heating device and the heating range of the heating device are not particularly limited. However, considering the influence on heating efficiency and the steel sheets, the heating device is preferably disposed ahead of the tool by a distance of 1 mm to 100 mm, and the heating range thereof is preferably 0.1 cm$^2$ to 100 cm$^2$.

The heating device may move separately from or in conjunction with the movement of the tool. For example, in a device where the tool is movable, the heating device may be attached to the device such that it can move at the same speed as the device, or alternatively in a device with a joint fixed to a movable stage, the heating device may be disposed on the stage. The heating device may be an induction heating device or a laser.

As mentioned above, the positional relationship between the welded portion and the heating device is not particularly limited as long as the heating device is disposed ahead of the tool in the advancing direction. However, when comparing the side where the advancing direction and the rotating direction of the tool are the same (advancing side, i.e., left side in FIG. 1) and the side where the advancing direction and the rotating direction are opposite to each other (retreating side, i.e., right side in FIG. 1), it is known that the resistance is higher and defects occur more easily in the advancing side, in friction stir welding. Therefore, by moving the heating range to the advancing side, weldability is stabilized even when performing high speed welding. When shifting the heating range to the advancing side, it is desirable that the position in the heating range which reaches the maximum temperature is slightly shifted from the center line of the welded portion and is within the width of the welded portion.

Further, when performing welding, if the heat conductivity ($TC_B$) of the backing material is too high, the heat balance at the time of welding cannot be maintained and defects are caused. On the other hand, if $TC_B$ is too low, excessive heat input is caused.

Further, from the viewpoint of appropriately controlling temperature distribution, $TC_B$ of the disclosure preferably satisfies the following relationship with the heat conductivity ($TC_S$) of the welding material.

Therefore, the heat conductivity of the backing material is preferably 0.5 times or more and around 1.0 times the heat conductivity of the welding material.

In other words, the above $TC_B$ and $TC_S$ preferably satisfy $0.5 \times TC_S \leq TC_B \leq 1.0 \times TC_S$.

Although the steel sheet is not particularly limited, the friction stir welding method described herein is particularly effective for steel sheets containing, as an additive element, 0.1 mass % to 0.6 mass % of carbon.

This is because, by applying the disclosure, such steel sheet can be welded at a particularly high speed compared to the conventional welding speed.

As previously mentioned, with high carbon steel contemplated in the disclosure, cracks may be generated after welding by the influence of hardening and embrittlement caused by rapid cooling and residual stress. Regarding this point, this disclosure enables suppression of generation of cracks by re-heating the welded portion after welding. However, excessive re-heating may become the cause of curing and embrittlement in a wider range. If re-heating is performed, it is necessary for the maximum temperature $T_p$ reached after the re-heating of the region which is heated by the rear heating device to be controlled to $0.6 \times T_{Ac1} \leq T_p \leq 1.2 \times T_{Ac1}$ in relationship with $T_{Ac1}$ to suppress such hardening and the like.

For the positional relationship between the welding tool and the rear heating device as well as the re-heating range of when performing the above re-heating, the re-heating itself is important and, as long as the re-heating device is disposed behind the welding tool in the advancing direction, the distance from the welding tool to the re-heating device and the heating range of the re-heating device are not particularly limited. However, considering the influence on efficiency and the steel sheets, the re-heating device is preferably disposed behind the tool by a distance of 1 mm to 200 mm, and the heating range thereof is preferably 0.1 cm$^2$ to 100 cm$^2$.

Further, the re-heating device can move separately from or in conjunction with the movement of the tool. For example, in a device where the tool is movable, the heating device may be attached to the device such that it can move at the same speed as the device, or alternatively in a device with a joint fixed to a movable stage, the heating device may be disposed on the stage. The heating device may be an induction heating device or a laser.

When performing the above re-heating, it is advantageous to provide a cooling device between the welding tool and the rear heating device to prevent cracks caused by tempering. As the cooling method, gas, mist, copper sheet contact and the like may be applied. Considering cooling efficiency, and the influences caused by oxidization of the joint and rust formation, it is desirable for inert gas to be used.

Further, cooling is preferably performed at the cooling rate of around 50° C./s to 1000° C./s until reaching 200° C. or lower.

As mentioned above, the disclosure enables high speed welding of steel sheets.

Specifically, while the general welding speed in friction stir welding is around 0.05 m/min to 0.2 m/min, welding can be performed, by applying the disclosure, at a rate of 0.5 m/min or more even when welding high carbon steel which is known as being difficult to weld at a high speed.

Other welding conditions in the friction stir welding method described herein are as follows.

Tool rotational speed: 100 rpm to 1500 rpm

To generate friction heat generated between the rotating tool and the welded portion of the workpiece, and to generate a plastic flow by stirring the welded portion softened by the heat with the tool, the tool rotational speed must be appropriately controlled. If the tool rotational speed is less than 100 rpm, an unwelded portion may be formed in the welded portion due to the lack of heat generation and plastic flow, or the rotating tool may be damaged due to the excessive load placed thereon. On the other hand, if the tool rotational speed exceeds 1500 rpm, sufficient thickness may not be obtained in the welded portion because heat generation and plastic flow becomes excessive and softened metal chips off from the welded portion as burrs, or the rotating tool may be excessively heated and damaged. Therefore, the tool rotational speed is preferably 100 rpm to 1500 rpm.

Tool rotational torque: 50 Nm to 1000 Nm

To generate friction heat generated between the rotating tool and the welded portion of the workpiece, and to generate a plastic flow by stirring the welded portion softened by the heat with the tool, the tool rotational torque must be set within an appropriate range. If the tool rotational torque is less than 50 Nm, an unwelded portion may be formed in the welded portion due to the lack of heat generation and plastic flow, or the rotating tool may be damaged due to the excessive load placed thereon. On the other hand, if the tool rotational torque exceeds 1000 Nm, sufficient thickness may not be obtained in the welded portion because heat generation and plastic flow becomes excessive and softened metal chips off from the welded portion as burrs, or the rotating tool may be excessively heated and damaged. Therefore, the tool rotational torque is preferably 50 Nm to 1000 Nm.

EXAMPLES

Example 1

Figure 4:
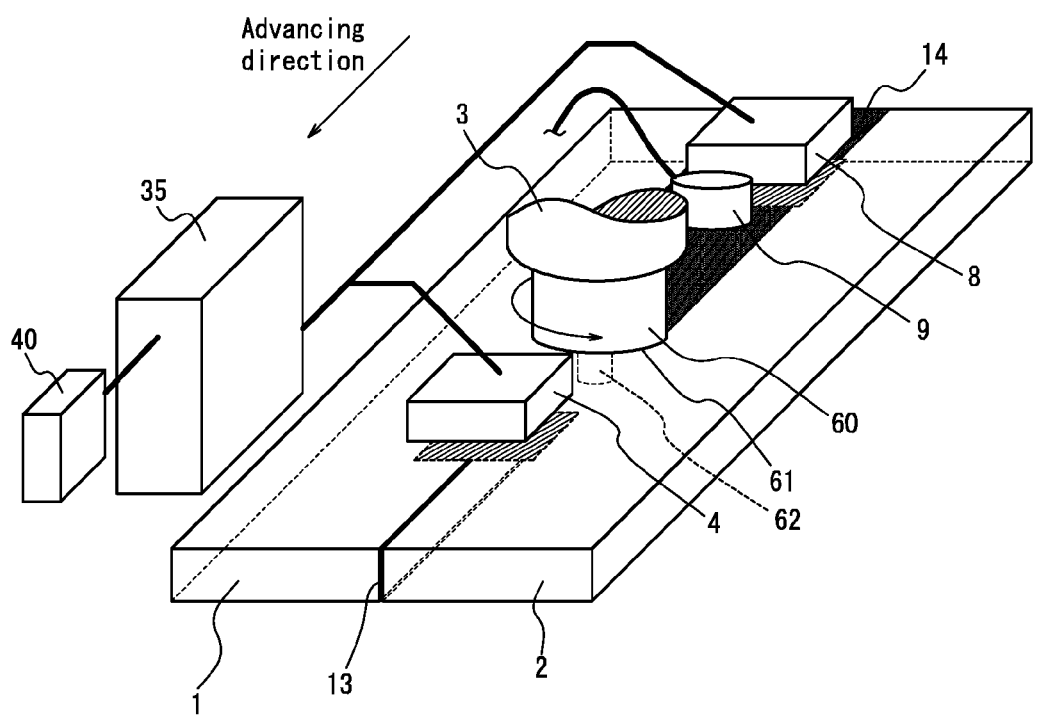
FIG. 4 shows a friction stir welding device used for carrying out the disclosed methods.

FIG. 4 shows a friction stir welding device. This device comprises an induction heating device 4 disposed ahead of a welding tool 60 in the advancing direction, and an induction heating device 8 disposed behind the welding tool 60 in the advancing direction, and heating is performed using these induction heating devices. The tool 60 is shaped such that it has a tungsten carbide-based protruded probe 62 and a flat shoulder 61. Further, to suppress oxidization of the welded portion, welding was performed while spraying argon gas from the front of the tool 60 in the advancing direction.

Regarding the reference symbols in the drawings, reference numeral 9 indicates a cooling device, reference numeral 35 indicates a power source, and reference numeral 40 indicates a heating temperature setting panel.

Using the friction stir welding device shown in FIG. 4, friction stir welding was performed on steel sheets having a sheet thickness of 1.2 mm (comprising C: 0.3 mass %, Si: 0.1 mass %, Mn: 1.0 mass %) under the conditions shown in Table 1. The joints were butted together using a non-angled or so-called I-type groove. Further, the frequency of when heating steel sheets using the induction heating device was set to 30 kHz to 300 kHz.

The results of investigating the possibility of welding when performing the above friction stir welding is also shown in Table 1.

Regarding the possibility of welding, "A" indicates that welding could be performed without damaging the tool, and no visible failure was observed across the whole length of the welded portion, and "B" indicates that the tool was damaged, or a visible defect was observed somewhere across the whole length of the welded portion. Failure refers to when irregularities of half or more of the sheet thickness or through holes are formed due to insufficient stirring or excessive stirring or when a crack is formed in the welded portion.

TABLE 1

| No. | Shoulder Diameter d (mm) | Rotating Speed (rpm) | Welding Speed (m/min) | $Ac_1$ Temperature $T_{Ac1}$ (° C.) | Maximum Temperature $T_U$ (° C.) | Width L (mm) | Welding Possibility | Joint Efficiency ≥80% | Remarks |
|---|---|---|---|---|---|---|---|---|---|
| 1 | 12 | 200 | 0.5 | 720 | 440 | 3.6 | A | Achieved | Example |
| 2 | 12 | 200 | 0.5 | 720 | 1280 | 23.7 | A | Achieved | Example |
| 3 | 12 | 200 | 0.5 | 720 | 460 | 22 | A | Achieved | Example |
| 4 | 12 | 200 | 0.5 | 720 | 1050 | 5 | A | Achieved | Example |
| 5 | 12 | 200 | 0.5 | 720 | 600 | 24 | A | Achieved | Example |
| 6 | 12 | 200 | 0.5 | 720 | 815 | 18 | A | Achieved | Example |
| 7 | 12 | 200 | 0.5 | 720 | 1055 | 12 | A | Achieved | Example |
| 8 | 12 | 200 | 0.5 | 720 | No Preheating | — | B | Not Achieved | Comparative Example |
| 9 | 12 | 200 | 0.5 | 720 | 350 | 0 | B | Not Achieved | Comparative Example |
| 10 | 12 | 200 | 0.5 | 720 | 900 | 2 | B | Not Achieved | Comparative Example |
| 11 | 12 | 200 | 0.5 | 720 | 1200 | 36 | B | Not Achieved | Comparative Example |
| 12 | 12 | 200 | 1 | 720 | 600 | 20 | A | Achieved | Example |
| 13 | 12 | 200 | 1 | 720 | 600 | 8 | A | Achieved | Example |
| 14 | 12 | 200 | 1 | 720 | 815 | 14 | A | Achieved | Example |
| 15 | 12 | 200 | 1 | 720 | 1055 | 8 | A | Achieved | Example |
| 16 | 12 | 200 | 1 | 720 | 1055 | 20 | A | Achieved | Example |
| 17 | 12 | 200 | 1 | 720 | No Preheating | — | B | Not Achieved | Comparative Example |
| 18 | 12 | 200 | 1 | 720 | 350 | 0 | B | Not Achieved | Comparative Example |
| 19 | 12 | 200 | 1 | 720 | 900 | 2 | B | Not Achieved | Comparative Example |
| 20 | 12 | 200 | 1 | 720 | 1200 | 36 | B | Not Achieved | Comparative Example |
| 21 | 12 | 500 | 1 | 720 | 600 | 20 | A | Achieved | Example |
| 22 | 12 | 500 | 1 | 720 | 600 | 8 | A | Achieved | Example |
| 23 | 12 | 500 | 1 | 720 | 815 | 14 | A | Achieved | Example |
| 24 | 12 | 500 | 1 | 720 | 1055 | 8 | A | Achieved | Example |
| 25 | 12 | 500 | 1 | 720 | 1055 | 20 | A | Achieved | Example |
| 26 | 12 | 500 | 1 | 720 | No Preheating | — | B | Not Achieved | Comparative Example |
| 27 | 12 | 500 | 1 | 720 | 350 | 0 | B | Not Achieved | Comparative Example |
| 28 | 12 | 500 | 1 | 720 | 900 | 2 | B | Not Achieved | Comparative Example |
| 29 | 12 | 500 | 1 | 720 | 1200 | 36 | B | Not Achieved | Comparative Example |
| 30 | 18 | 200 | 1 | 720 | 600 | 30 | A | Achieved | Example |
| 31 | 18 | 200 | 1 | 720 | 600 | 10 | A | Achieved | Example |
| 32 | 18 | 200 | 1 | 720 | 815 | 17 | A | Achieved | Example |
| 33 | 18 | 200 | 1 | 720 | 1100 | 10 | A | Achieved | Example |
| 34 | 18 | 200 | 1 | 720 | 1100 | 36 | A | Achieved | Example |
| 35 | 18 | 200 | 1 | 720 | No Preheating | — | B | Not Achieved | Comparative Example |
| 36 | 18 | 200 | 1 | 720 | 350 | 0 | B | Not Achieved | Comparative Example |
| 37 | 18 | 200 | 1 | 720 | 900 | 4 | B | Not Achieved | Comparative Example |
| 38 | 18 | 200 | 1 | 720 | 1200 | 42 | B | Not Achieved | Comparative Example |
| 39 | 12 | 200 | 2 | 720 | 600 | 20 | A | Achieved | Example |
| 40 | 12 | 200 | 2 | 720 | 600 | 8 | A | Achieved | Example |
| 41 | 12 | 200 | 2 | 720 | 815 | 14 | A | Achieved | Example |
| 42 | 12 | 200 | 2 | 720 | 1055 | 8 | A | Achieved | Example |
| 43 | 12 | 200 | 2 | 720 | 1055 | 20 | A | Achieved | Example |
| 44 | 12 | 200 | 2 | 720 | No Preheating | — | B | Not Achieved | Comparative Example |
| 45 | 12 | 200 | 2 | 720 | 350 | 0 | B | Not Achieved | Comparative Example |
| 46 | 12 | 200 | 2 | 720 | 900 | 2 | B | Not Achieved | Comparative Example |
| 47 | 12 | 200 | 2 | 720 | 1200 | 36 | B | Not Achieved | Comparative Example |

As shown in Table 1, a joint with no welding defects and having high joint efficiency was obtained even with a welding speed exceeding 0.5 m/min, when performing friction stir welding in accordance with the disclosure.

Example 2

Similar to Example 1, friction stir welding was performed under the conditions shown in Table 2 using the friction stir welding device shown in FIG. 4. Although the welding conditions were substantially the same as Example 1, a backing material was used when performing welding in Example 2.

The results of investigating the possibility of welding, joint efficiency, and stability of bead width when performing the above friction stir welding are also shown in Table 2. As for bead width, the minimum bead width and the maximum bead width were measured, and when the difference between them was 20% or less of the minimum bead width, bead width was evaluated as being stable.

TABLE 2

| No. | Shoulder Diameter d (mm) | Rotating Speed (rpm) | Welding Speed (m/min) | Backing Material $TC_B$/ Steel Sheet $TC_S$ | $Ac_1$ Temperature $T_{Ac1}$ (° C.) | Maximum Temperature $T_U$ (° C.) | Width L (mm) | Welding Possibility | Joint Efficiency ≥80% | Stability of Bead Width (Difference ≤20%) | Remarks |
|---|---|---|---|---|---|---|---|---|---|---|---|
| 1 | 15 | 300 | 0.5 | 0.5 | 720 | 880 | 20 | A | Achieved | Stable | Example |
| 2 | 15 | 300 | 0.5 | 0.8 | 720 | 880 | 20 | A | Achieved | Stable | Example |
| 3 | 15 | 300 | 0.5 | 1 | 720 | 880 | 20 | A | Achieved | Stable | Example |
| 4 | 15 | 300 | 0.5 | 0.4 | 720 | 880 | 20 | A | Achieved | Unstable | Example |

TABLE 2-continued

| No. | Shoulder Diameter d (mm) | Rotating Speed (rpm) | Welding Speed (m/min) | Backing Material $TC_B$/ Steel Sheet $TC_S$ | $Ac_1$ Temperature $T_{Ac1}$ (° C.) | Maximum Temperature $T_U$ (° C.) | Width L (mm) | Welding Possibility | Joint Efficiency ≥80% | Stability of Bead Width (Difference ≤20%) | Remarks |
|---|---|---|---|---|---|---|---|---|---|---|---|
| 5 | 15 | 300 | 0.5 | 1.5 | 720 | 880 | 20 | A | Achieved | Unstable | Example |
| 6 | 15 | 300 | 1 | 0.5 | 720 | 880 | 20 | A | Achieved | Stable | Example |
| 7 | 15 | 300 | 1 | 0.8 | 720 | 880 | 20 | A | Achieved | Stable | Example |
| 8 | 15 | 300 | 1 | 1 | 720 | 880 | 20 | A | Achieved | Stable | Example |
| 9 | 15 | 300 | 1 | 0.4 | 720 | 880 | 20 | A | Achieved | Unstable | Example |
| 10 | 15 | 300 | 1 | 1.5 | 720 | 880 | 20 | A | Achieved | Unstable | Example |

As shown in Table 2, a joint with a stable bead width and no welding defects was obtained with high joint efficiency even with a welding speed exceeding 0.5 m/min, when performing our friction stir welding.

Example 3

Similar to Example 1, friction stir welding was performed under the conditions shown in Table 3 using the friction stir welding device shown in FIG. 4. Although the welding conditions were substantially the same as Example 1, a cooling device 9 and a rear heating device 8 were used when performing welding in Example 3.

The results of investigating the joint efficiency when performing the above friction stir welding and the standard deviation of the joint efficiency of ten samples obtained under the same conditions are also shown in Table 3.

Regarding the possibility of welding, "B" and "A" indicate that welding could be performed, "A" indicates that welding could be performed without damaging the tool, no visible failure was observed across the whole length of the welded portion, and the bead width was stable, "B" indicates that welding could be performed without damaging the tool, and no visible failure was observed in the welded portion, and "C" indicates that the tool was damaged or a visible failure was observed somewhere across the whole length of the welded portion. Failure refers to when irregularities of half or more of the sheet thickness or through holes are formed due to insufficient stirring or excessive stirring or when a crack is formed in the welded portion.

Regarding the evaluation of standard deviation of joint efficiency of the samples, the joint strength was divided by the base material strength to obtain a percentage value, and those with a value of more than 5% and 8% or less are indicated as "C", those with a value of more than 3% and 5% or less are indicated as "B", and those with a value of 3% or less are indicated as "A".

TABLE 3

| No. | Shoulder Diameter d (mm) | Rotating Speed (rpm) | Welding Speed (m/min) | $Ac_1$ Temperature $T_{Ac1}$ (° C.) | Maximum Temperature $T_U$ (° C.) | Width L (mm) | Maximum Temperature after Welding (° C.) | Cooling |
|---|---|---|---|---|---|---|---|---|
| 1 | 12 | 200 | 0.5 | 720 | 815 | 18 | 1100 | Not Performed |
| 2 | 12 | 200 | 0.5 | 720 | 815 | 18 | 1100 | Not Performed |
| 3 | 12 | 200 | 0.5 | 720 | 815 | 18 | 1100 | Not Performed |
| 4 | 12 | 200 | 0.5 | 720 | 815 | 18 | 1100 | Performed |
| 5 | 12 | 200 | 0.5 | 720 | 815 | 18 | 1100 | Performed |
| 6 | 12 | 200 | 0.5 | 720 | 815 | 18 | 1100 | Performed |
| 7 | 12 | 200 | 0.5 | 720 | 815 | 18 | 1100 | Not Performed |
| 8 | 12 | 200 | 0.5 | 720 | 815 | 18 | 1100 | Not Performed |
| 9 | 12 | 200 | 0.5 | 720 | 815 | 18 | 1100 | Not Performed |
| 10 | 12 | 200 | 0.5 | 720 | 815 | 18 | 1100 | Performed |
| 11 | 12 | 200 | 0.5 | 720 | 815 | 18 | 1100 | Performed |
| 12 | 12 | 500 | 1 | 720 | 815 | 14 | 1100 | Not Performed |
| 13 | 12 | 500 | 1 | 720 | 815 | 14 | 1100 | Not Performed |
| 14 | 12 | 500 | 1 | 720 | 815 | 14 | 1100 | Not Performed |
| 15 | 12 | 500 | 1 | 720 | 815 | 14 | 1100 | Performed |
| 16 | 12 | 500 | 1 | 720 | 815 | 14 | 1100 | Performed |
| 17 | 12 | 500 | 1 | 720 | 815 | 14 | 1100 | Performed |
| 18 | 12 | 500 | 1 | 720 | 815 | 14 | 1100 | Not Performed |
| 19 | 12 | 500 | 1 | 720 | 815 | 14 | 1100 | Not Performed |
| 20 | 12 | 500 | 1 | 720 | 815 | 14 | 1100 | Not Performed |
| 21 | 12 | 500 | 1 | 720 | 815 | 14 | 1100 | Performed |
| 22 | 12 | 500 | 1 | 720 | 815 | 14 | 1100 | Performed |

| No. | Maximum Temperature before Postheating (° C.) | Postheating | Maximum Temperature after Postheating (° C.) | Welding Possibility | Joint Efficiency ≥80% | Standard Deviation of Joint Efficiency (%, N = 10) | Remarks |
|---|---|---|---|---|---|---|---|
| 1 | 620 | Performed | 720 | A | Achieved | B | Example |
| 2 | 480 | Performed | 510 | A | Achieved | B | Example |
| 3 | 820 | Performed | 600 | A | Achieved | B | Example |
| 4 | 280 | Performed | 540 | A | Achieved | A | Example |

TABLE 3-continued

| | | | | | | | | |
|---|---|---|---|---|---|---|---|---|
| 5 | 110 | Performed | 600 | A | Achieved | A | Example |
| 6 | 160 | Performed | 820 | A | Achieved | A | Example |
| 7 | — | Not Performed | — | A | Achieved | C | Example |
| 8 | 630 | Performed | 1215 | A | Achieved | C | Example |
| 9 | 715 | Performed | 940 | A | Achieved | C | Example |
| 10 | 180 | Performed | 1215 | A | Achieved | C | Example |
| 11 | 140 | Performed | 300 | A | Achieved | C | Example |
| 12 | 615 | Performed | 735 | A | Achieved | B | Example |
| 13 | 465 | Performed | 525 | A | Achieved | B | Example |
| 14 | 805 | Performed | 595 | A | Achieved | B | Example |
| 15 | 265 | Performed | 550 | A | Achieved | A | Example |
| 16 | 105 | Performed | 615 | A | Achieved | A | Example |
| 17 | 155 | Performed | 825 | A | Achieved | A | Example |
| 18 | — | Not Performed | — | A | Achieved | C | Example |
| 19 | 615 | Performed | 1210 | A | Achieved | C | Example |
| 20 | 710 | Performed | 930 | A | Achieved | C | Example |
| 21 | 175 | Performed | 1210 | A | Achieved | C | Example |
| 22 | 130 | Performed | 295 | A | Achieved | C | Example |

As shown in Table 3, a joint with no welding defects was obtained with high joint efficiency even with a welding speed exceeding 0.5 m/min, when performing our friction stir welding. In particular, when performing appropriate re-heating treatment or cooling-re-heating treatment after friction stir welding, an even more stable joint was obtained.

The invention claimed is:

1. A friction stir welding method comprising:
inserting a rotating tool into an unwelded portion where two or more steel sheets are overlapped or butted together;
moving the rotating tool along portions to be welded while rotating the tool so that a softened portion is formed in the steel sheets by friction heat generated between the rotating tool and the steel sheets, and the steel sheets are welded together by utilizing a plastic flow generated by the softened portion being stirred;
preheating the unwelded portion before welding thereof by the rotating tool using a heating device disposed ahead of the rotating tool in an advancing direction, wherein
a surface temperature distribution in a direction perpendicular to the advancing direction in the steel sheets is caused by the preheating, the surface temperature distribution at a position where welding is performed by the rotating tool being such that a maximum temperature $T_U$ satisfies $0.6 \times T_{Ac1} < T_U < 1.8 \times T_{Ac1}$, and a width L of a heating region reaching a surface temperature greater than a temperature $T_L = 0.6 \times T_{Ac1}$ satisfies $0.3 \times d \leq L \leq 2.0 \times d$ with respect to a diameter d of a shoulder of the rotating tool; and
re-heating a welded portion formed by the rotating tool with a rear heating device disposed behind the rotating tool in the advancing direction, and a maximum temperature $T_p$ after re-heating of the region to be re-heated by the rear heating device satisfies $0.6 \times T_{Ac1} \leq T_p \leq 1.2 \times T_{Ac1}$,
where $T_{Ac1}$ is a temperature defined by formula (1) using amounts of added elements of the steel sheets:

$$T_{Ac1} = 723 - 10.7[\% \text{ Mn}] - 16.9[\% \text{ Ni}] + 29.1[\% \text{ Si}] + 16.9[\% \text{ Cr}] + 290[\% \text{ As}] + 6.38[\% \text{ W}] \quad (1)$$

where [% M] represents content of M element (mass %) in the steel sheets.

2. The friction stir welding method according to claim 1, wherein heat conductivity $TC_B$ of a backing material disposed in a position opposite to a rotating tool across the unwelded portion satisfies $0.5 \times TC_S \leq TC_B \leq 1.0 \times TC_S$ with respect to heat conductivity $TC_S$ of the steel sheets.

3. The friction stir welding method according to claim 1, wherein the heating device is a high-frequency induction heating device, and the frequency to be used of the heating device is 20 kHz or more and 360 kHz or less.

4. The friction stir welding method according to claim 1, wherein the C content of the steel sheet containing most C among the two or more steel sheets is 0.1 mass % or more and 0.6 mass % or less.

5. The friction stir welding method according to claim 1, wherein a cooling device is disposed between the rotating tool and the rear heating device to cool the welded portion.

6. A method of manufacturing a joint of the steel sheets with the friction stir welding method according to claim 1.

7. The friction stir welding method according to claim 2, wherein the heating device is a high-frequency induction heating device, and the frequency to be used of the heating device is 20 kHz or more and 360 kHz or less.

8. The friction stir welding method according to claim 2, wherein the C content of the steel sheet containing most C among the two or more steel sheets is 0.1 mass % or more and 0.6 mass % or less.

9. The friction stir welding method according to claim 3, wherein the C content of the steel sheet containing most C among the two or more steel sheets is 0.1 mass % or more and 0.6 mass % or less.

10. The friction stir welding method according to claim 7, wherein the C content of the steel sheet containing most C among the two or more steel sheets is 0.1 mass % or more and 0.6 mass % or less.

11. A method of manufacturing a joint of the steel sheets with the friction stir welding method according to claim 2.

12. A method of manufacturing a joint of the steel sheets with the friction stir welding method according to claim 3.

13. A method of manufacturing a joint of the steel sheets with the friction stir welding method according to claim 4.

14. A method of manufacturing a joint of the steel sheets with the friction stir welding method according to claim 1.

15. A method of manufacturing a joint of the steel sheets with the friction stir welding method according to claim 5.

16. A method of manufacturing a joint of the steel sheets with the friction stir welding method according to claim 7.

17. A method of manufacturing a joint of the steel sheets with the friction stir welding method according to claim 8.

18. A method of manufacturing a joint of the steel sheets with the friction stir welding method according to claim 9.

19. A method of manufacturing a joint of the steel sheets with the friction stir welding method according to claim 10.

20. The friction stir welding method according to claim 5, further comprising performing cooling at a cooling rate of around 50° C./s to 1000° C./s.

21. The friction stir welding method according to claim 20, wherein cooling is performed until reaching 200° C. or lower.

* * * * *